US008886756B2

(12) United States Patent
Anchan et al.

(10) Patent No.: US 8,886,756 B2
(45) Date of Patent: Nov. 11, 2014

(54) EXCHANGING DATA BETWEEN A USER EQUIPMENT AND AN APPLICATION SERVER

(75) Inventors: Kirankumar Anchan, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 13/107,276

(22) Filed: May 13, 2011

(65) Prior Publication Data

US 2012/0290686 A1 Nov. 15, 2012

(51) Int. Cl.
| | | |
|---|---|---|
| *G06F 15/16* | (2006.01) | |
| *H04L 29/12* | (2006.01) | |
| *H04L 29/06* | (2006.01) | |
| *H04W 8/26* | (2009.01) | |
| *H04W 84/04* | (2009.01) | |
| *H04W 48/16* | (2009.01) | |
| *H04W 84/12* | (2009.01) | |
| *H04W 88/06* | (2009.01) | |

(52) U.S. Cl.
CPC ........ *H04L 61/2575* (2013.01); *H04L 61/6077* (2013.01); *H04W 8/26* (2013.01); *H04W 84/04* (2013.01); *H04L 61/2514* (2013.01); *H04W 48/16* (2013.01); *H04L 63/029* (2013.01); *H04W 84/12* (2013.01); *H04W 88/06* (2013.01)
USPC ............................ 709/218; 711/123; 711/126

(58) Field of Classification Search
CPC . H04L 29/06; H04L 29/06027; H04L 65/103; H04L 61/2514; H04L 61/6077; H04L 61/2575; H04L 63/029; H04L 67/025; H04L 67/34; H04L 67/20; H04W 88/06; H04W 84/04; H04W 8/26; H04W 48/16; H04W 84/12; H04M 3/56; H04M 7/00; G06F 15/16

USPC ........................................................ 709/218
See application file for complete search history.

(56) References Cited

U.S. PATENT DOCUMENTS 6,185,689 B1 * 2/2001 Todd et al. ...................... 726/25
7,602,784 B2 * 10/2009 Piche et al. .................... 370/392
(Continued)

FOREIGN PATENT DOCUMENTS

| EP | 2045968 A1 | 4/2009 |
|---|---|---|
| WO | WO2007125379 A1 | 11/2007 |

OTHER PUBLICATIONS

International Search Report and Written Opinion—PCT/US2012/037843—ISA/EPO—Aug. 28, 2012.

(Continued)

*Primary Examiner* — Anthony Mejia
*Assistant Examiner* — Mehulkumar Shah
(74) *Attorney, Agent, or Firm* — Raphael Freiwirth

(57) ABSTRACT

A user equipment (UE) and an application server exchange data in a wireless communications network. The UE is configured to connect to both a wireless local area network (WLAN) and a wireless wide area network (WWAN). The application server is positioned within the WWAN behind a WWAN firewall. The WLAN includes a WLAN network address translation (NAT) component and firewall such that the UE and the application server do not have a persistent data connection over the WLAN. In an embodiment, the application server can open a WWAN firewall to permit uploads from the UE over the WLAN. In another embodiment, the UE can open the WLAN firewall and/or NAT to permit downloads from the application server over the WLAN. In another embodiment, the application server or UE can upload files to a server outside the WLAN and WWAN firewalls and send a link to the uploaded files for retrieval.

10 Claims, 10 Drawing Sheets

(56) References Cited

U.S. PATENT DOCUMENTS

| | | | |
|---|---|---|---|
| 7,817,631 B1* | 10/2010 | Qian | 370/389 |
| 8,305,980 B1* | 11/2012 | Nix | 370/329 |
| 2002/0004856 A1* | 1/2002 | Sudarshan et al. | 709/330 |
| 2003/0079030 A1* | 4/2003 | Cocotis et al. | 709/229 |
| 2003/0088619 A1* | 5/2003 | Boundy | 709/204 |
| 2003/0110273 A1* | 6/2003 | Ventura | 709/229 |
| 2003/0167316 A1 | 9/2003 | Bramnick et al. | |
| 2005/0197156 A1 | 9/2005 | Fourquin et al. | |
| 2005/0286466 A1* | 12/2005 | Tagg et al. | 370/329 |
| 2006/0068777 A1 | 3/2006 | Sadowsky et al. | |
| 2006/0136475 A1* | 6/2006 | Karmakar et al. | 707/102 |
| 2006/0270448 A1 | 11/2006 | Huotari et al. | |
| 2006/0291502 A1* | 12/2006 | Kalofonos | 370/466 |
| 2007/0019622 A1* | 1/2007 | Alt et al. | 370/352 |
| 2007/0294407 A1* | 12/2007 | Owen et al. | 709/226 |
| 2008/0198819 A1* | 8/2008 | Brown et al. | 370/338 |
| 2009/0088188 A1 | 4/2009 | Wormald et al. | |
| 2009/0119762 A1* | 5/2009 | Thomson et al. | 726/7 |
| 2009/0124284 A1 | 5/2009 | Scherzer et al. | |
| 2009/0300137 A1* | 12/2009 | Tyhurst et al. | 709/217 |
| 2009/0323632 A1 | 12/2009 | Nix | |
| 2010/0066804 A1* | 3/2010 | Shoemake et al. | 348/14.02 |
| 2010/0232409 A1* | 9/2010 | Kim et al. | 370/338 |
| 2010/0296499 A1* | 11/2010 | Karaoguz et al. | 370/338 |
| 2010/0329225 A1* | 12/2010 | Balasubramanian | 370/338 |
| 2011/0007637 A1* | 1/2011 | Chen et al. | 370/252 |
| 2011/0162060 A1* | 6/2011 | Vijayakumar et al. | 726/13 |
| 2012/0008578 A1* | 1/2012 | Kant et al. | 370/329 |

OTHER PUBLICATIONS

Telefon AB LM Ericsson: "Recommendations for NAT traversal for PSS", 3GPP Draft; S4-080498-NATS, 3rd Generation Partnership Project (3GPP), Mobile Competence Centre ; 650, Route Des Lucioles; F-06921 Sophia-Antipolis Cedex; France, vol. SA WG4, no. Sophia Antipolis, France; 20080813, Aug. 13, 2008, XP050290250, [retrieved on Aug. 13, 2008].

* cited by examiner

EXCHANGING DATA BETWEEN A USER EQUIPMENT AND AN APPLICATION SERVER

BACKGROUND OF THE INVENTION

1. Field of the Invention

Embodiments relate to exchanging data between a user equipment (UE) and an application server.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

A user equipment (UE) and an application server exchange data in a wireless communications network. The UE is configured to connect to both a wireless local area network (WLAN) and a wireless wide area network (WWAN). The application server is positioned within the WWAN behind a WWAN firewall. The WLAN includes a WLAN network address translation (NAT) component and firewall such that the UE and the application server do not have a persistent data connection over the WLAN. In an embodiment, the application server can open a WWAN firewall to permit uploads from the UE over the WLAN. In another embodiment, the UE can open the WLAN firewall and/or NAT to permit downloads from the application server over the WLAN. In another embodiment, the application server or UE can upload files to a server outside the WLAN and WWAN firewalls and send a link to the uploaded files for retrieval

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
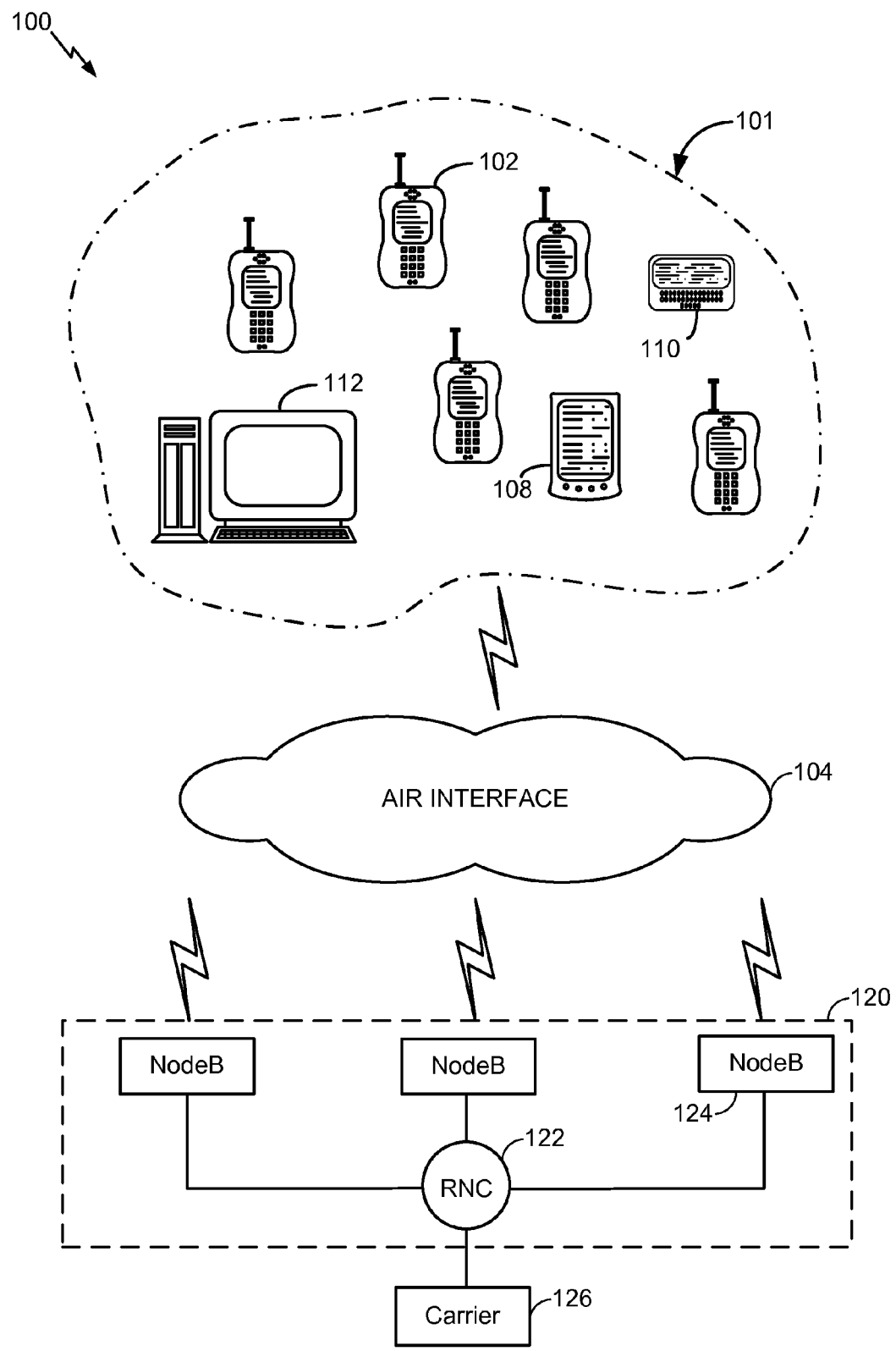
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention.

Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
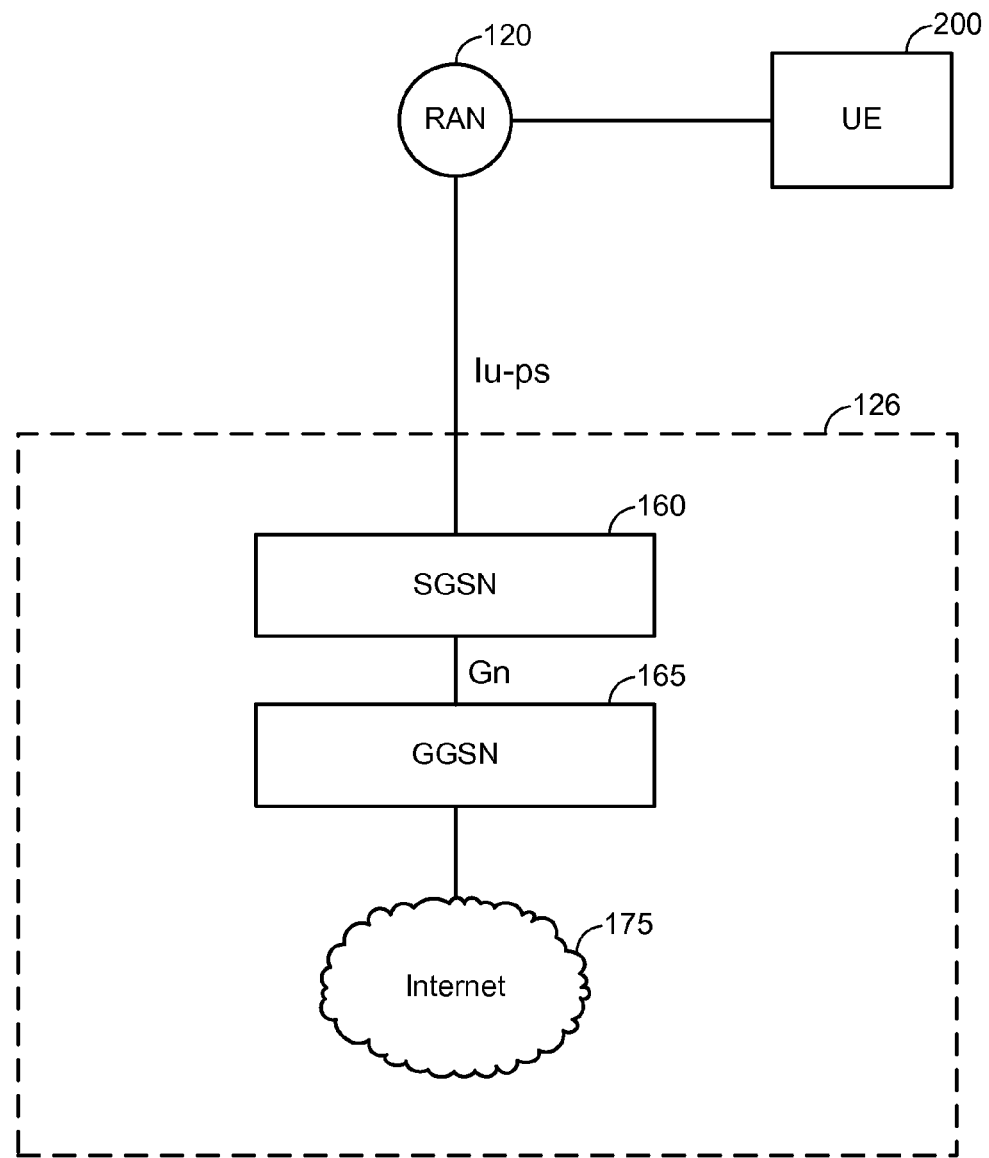
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reachability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
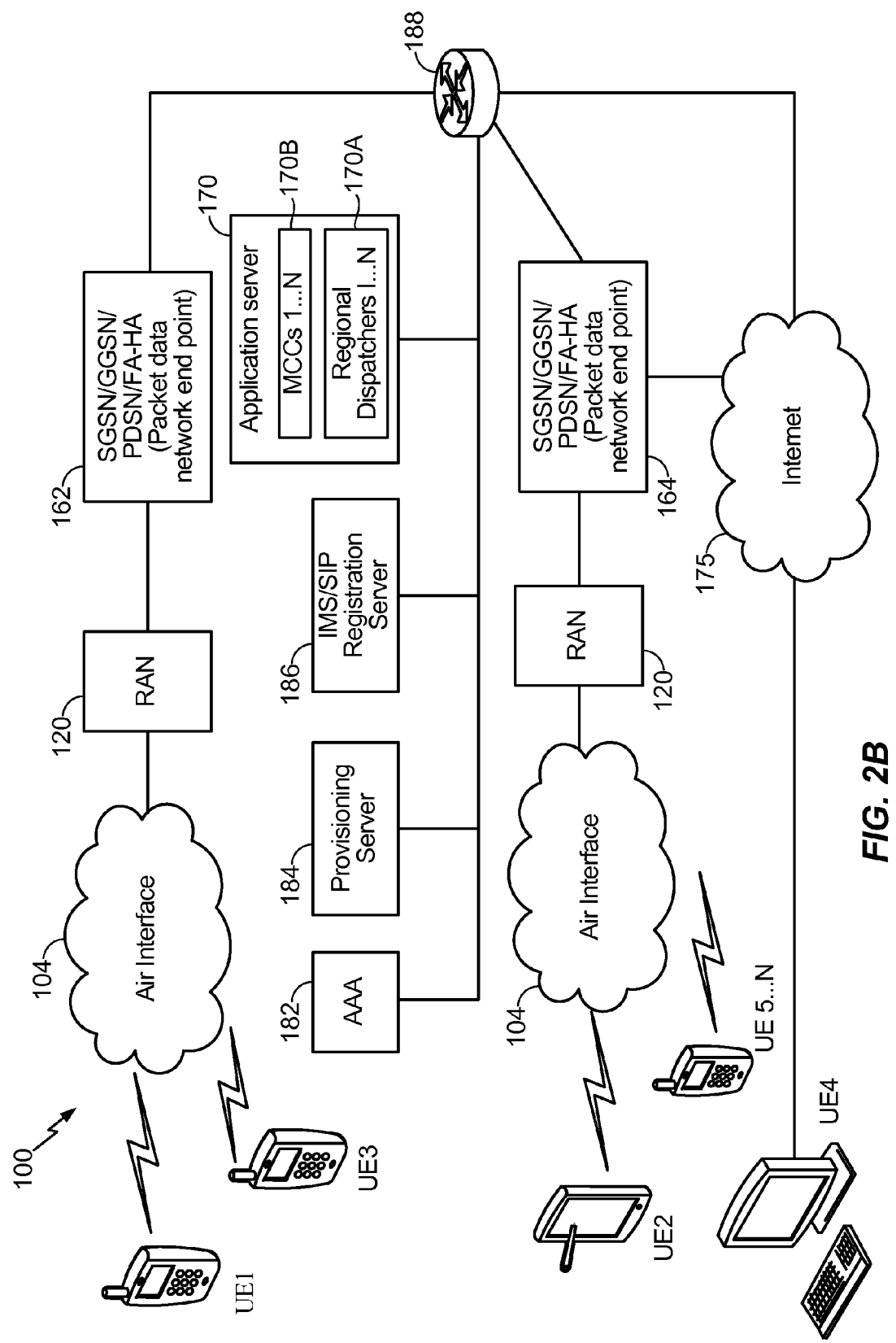
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
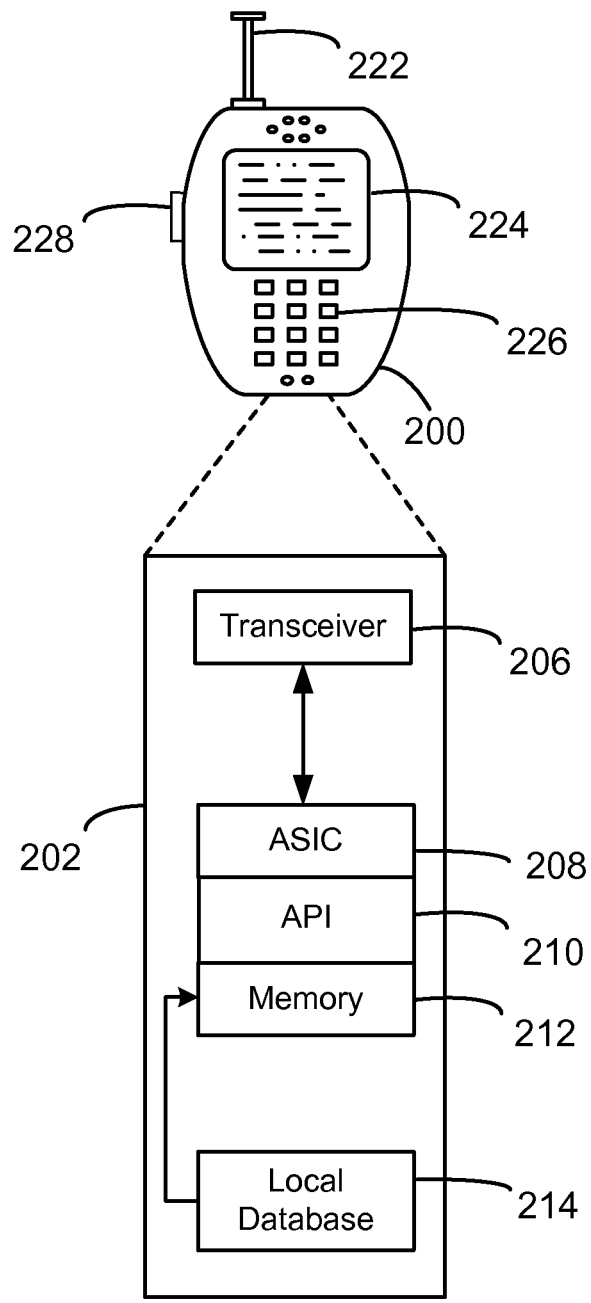
FIG. 3 is an illustration of user equipment (UE) in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

| DTCH to Transport Channel mappings in RRC connected mode | | | | |
|---|---|---|---|---|
| | RACH | FACH | DCH | E-DCH | HS-DSCH |
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel. 7) |
| URA_PCH | No | No | No | No | No | wherein the notations (rel. 8) and (rel. 7) indicate the associated 3GPP release where the indicated channel was introduced for monitoring or access.

Figure 4:
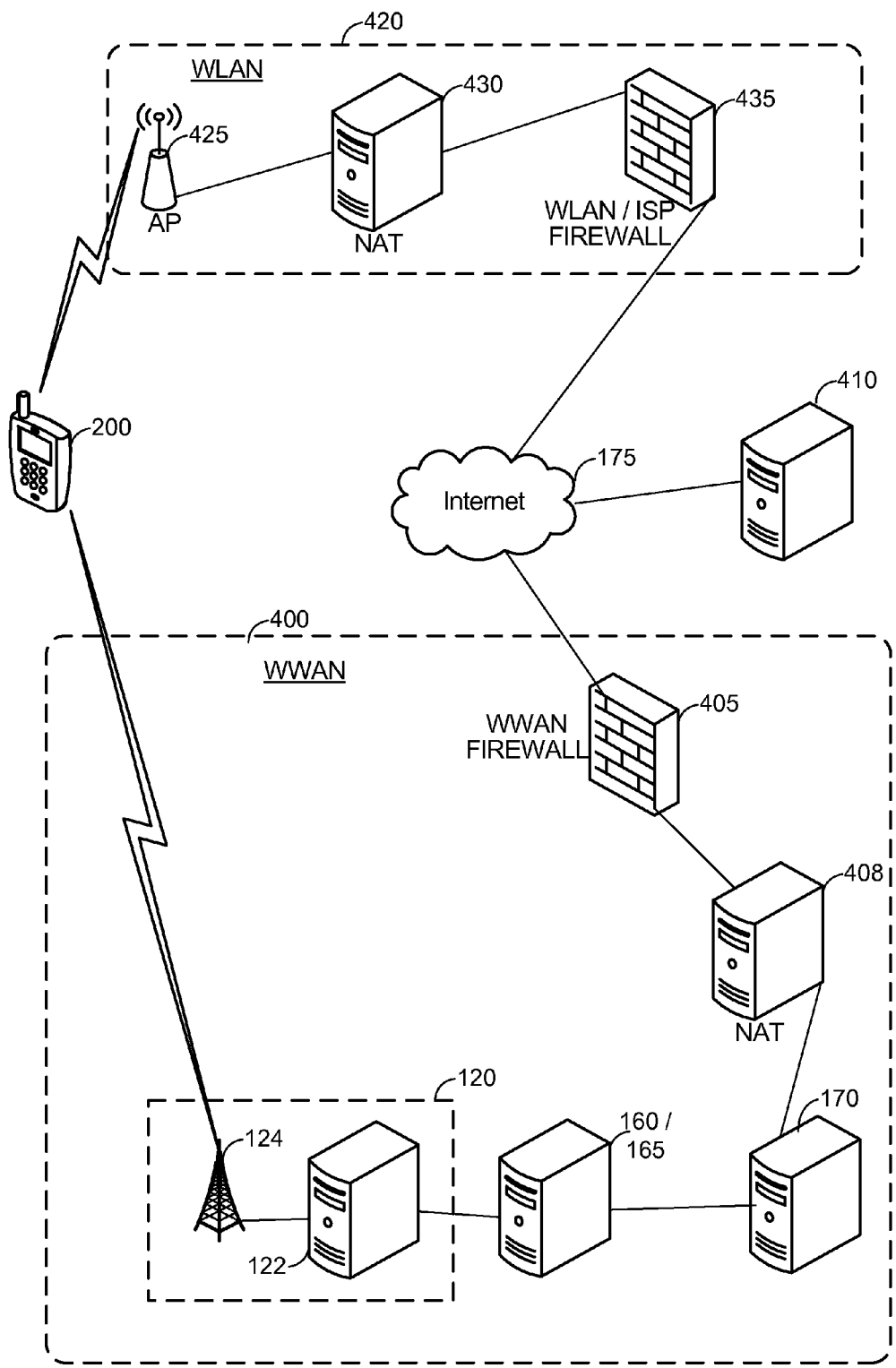
FIG. 4 illustrates the wireless communication system of FIG. 1 in accordance with another embodiment of the invention.

FIG. 4 illustrates the wireless communication system of FIG. 1 in accordance with another embodiment of the invention. As shown in FIG. 4, UE 200 is configured to connect concurrently to a Wireless Wide Area Network (WWAN) 400 via a Node B 124 within the RAN 120 and a Wireless Local Area Network (WLAN) 420 via a WLAN Access Point (AP) 425 (e.g., a WiFi hotspot or router). The network components of the WWAN 400, which may correspond to a service provider network, include the RAN 120, the SGSN 160, the GGSN 165 and the application server 170, as discussed above with respect to FIGS. 1, 2A and 2B. In FIG. 4, the WWAN 400 further includes a WWAN firewall 405, which may also be referred to as a service provider firewall, and a Network Address Translation (NAT) component 408. While the NAT 408 and WWAN firewall 405 are illustrated as separate entities or components in FIG. 4, it will be appreciated that their respective functions can be consolidated into a single server or switch in other embodiments of the invention (e.g., such as routing unit 188 of FIG. 2B, for example). The functionality of the NAT 408 is described in more detail below with respect to NAT 430 that is positioned within the WLAN 420.

As will be appreciated by one of ordinary skill in the art, firewalls can be implemented in hardware, software or a combination of both. Firewalls are frequently used to prevent unauthorized Internet users from accessing private networks, in this case the service provider network or WWAN 400, that are connected to the Internet 175. The WWAN firewall 405 is configured to permit or deny network transmissions based upon a set of rules and other criteria. All messages entering or leaving the WWAN 400 via the Internet 175 pass through the WWAN firewall 405, which inspects each message and blocks those that do not meet the specified security criteria.

By punching through the WWAN firewall 405, the application server 170 can access the Internet 175. As shown in FIG. 4, the Internet 175 is connected to both WLAN 420 and to a file server 410, which is positioned outside of both the WWAN firewall 405 and a WLAN firewall 435 (discussed below in more detail). Through the Internet 175, the application server 170 of the WWAN 400 is theoretically connected to the WLAN 420, although it will be appreciated that the WLAN 420 has its own security (e.g., a NAT/Firewall) that may block access.

Turning to the WLAN 420, the WLAN 420 includes the WLAN AP 425 (e.g., a WiFi router or hotspot, etc.) that was mentioned above, and further includes a Network Address Translation (NAT) component 430 and a WLAN firewall 435, which may alternatively be referred to as an Internet Service Provider (ISP) firewall. While the NAT 430 and WLAN firewall 435 are illustrated as separate entities or components in FIG. 4, it will be appreciated that their respective functions can be consolidated into a single server or switch in other embodiments of the invention (e.g., such as routing unit 188 of FIG. 2B, for example).

Referring to FIG. 4, NAT 430 and WLAN firewall 435 separate the WLAN 420 from the Internet 175 and/or other core networks or WLANs. For example, the NAT 430 can be configured to modify network address information in datagram (IP) packet headers such that outgoing Internet Protocol (IP) packets from the WLAN 420 appear to originate from the NAT 430 instead of the originator of the IP-packet (e.g., UE 200), and incoming IP packets appear to terminate at the NAT 430. The NAT 430 can be implemented in accordance with any of a variety of schemes of translating addresses and/or port numbers, with each type of NAT-scheme affecting application communication protocols differently. For example, NAT-types include full-cone NAT (also known as one-to-one NAT), address-restricted cone NAT, port-restricted cone NAT and symmetric NAT.

With respect to the WLAN firewall 435, the WLAN firewall 435 can be implemented in hardware, software or a combination of both. Firewalls are frequently used to prevent unauthorized Internet users from accessing private networks, such as intranets, that are connected to the Internet 175. The WLAN firewall 435 is configured to permit or deny network transmissions based upon a set of rules and other criteria. All messages entering or leaving the WLAN 420 pass through the WLAN firewall 435, which inspects each message and blocks those that do not meet the specified security criteria. Further, the WLAN firewall 435 provides private addresses as defined in RFC 1918 to the hosts protected behind the WLAN firewall 435. Once a pass through connection is opened through the WLAN firewall 435, NAT translation association for the data session is often released by the NAT 430 within a few seconds of data inactivity for the session. Thus, the NAT 430 and WLAN Firewall 435 are used to collectively refer to the hardware and/or software that performs the firewall and NAT functions for a particular intranet, in this case the WLAN 420.

UEs can typically obtain higher bandwidth via the WLAN 420 (e.g., WiFi hotspots, etc.) as compared to the WWAN 400 (e.g., a cellular communications system, etc.). Accordingly, precious WWAN bandwidth may be consumed if the WWAN is used for large file transfers (uploads or downloads) when the WLAN could be used instead, or when the UE could have waited for a WLAN connection before initiating the large file transfer. However, it can be difficult to send data from UE 200 to the application server 170 within the WWAN 400 over the WLAN 420 due to the security settings of the NAT 430, WLAN firewall 435 and the WWAN firewall 405. Embodiments of the invention are thereby directed to exchanging data between a UE and the WWAN-based application server 170 using a high-bandwidth WLAN connection even when a direct connection between be WLAN 420 and the WWAN 400 is difficult to establish due to the security settings of the NAT 430, WLAN firewall 435 and/or WWAN firewall 405.

Figure 5A:
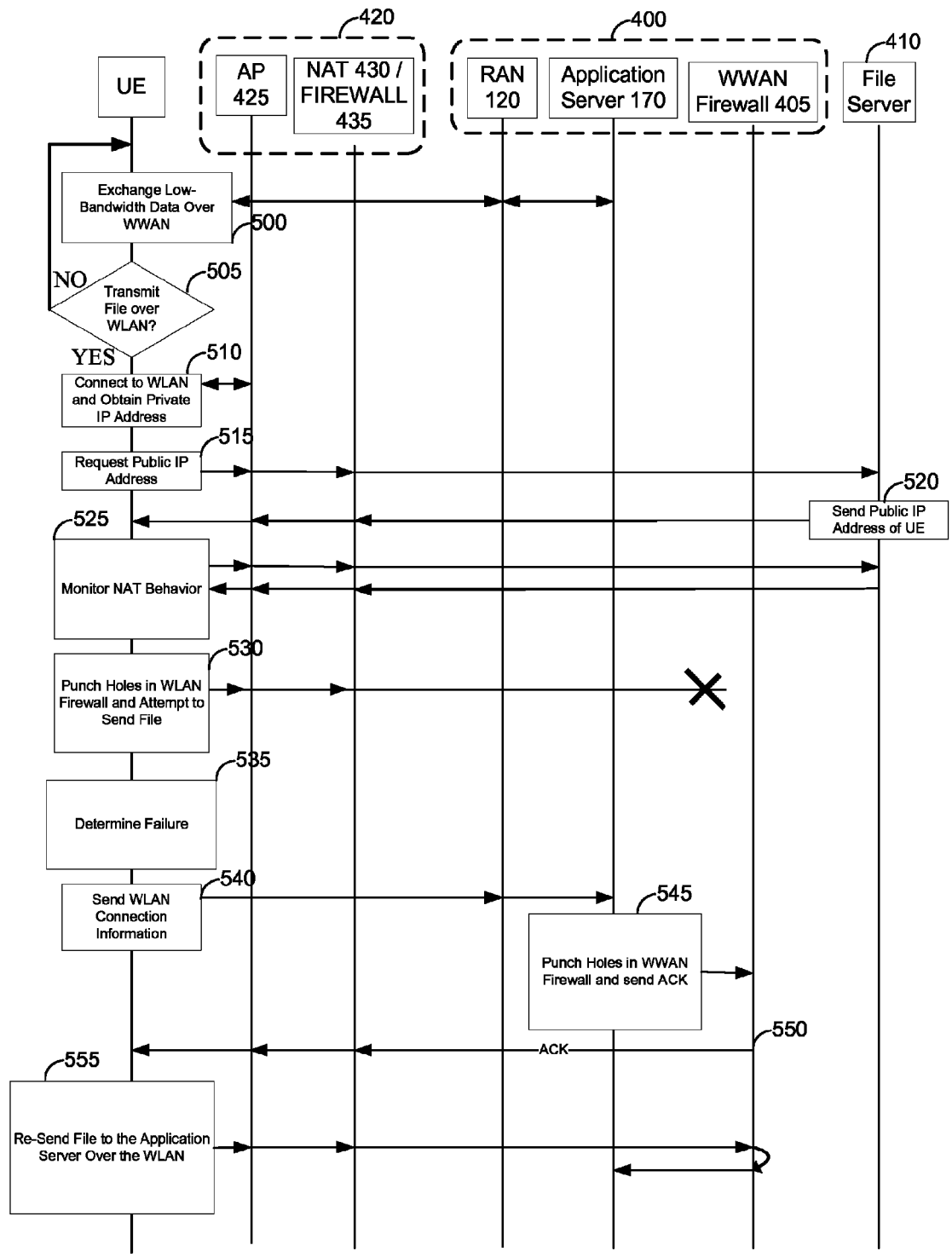
FIG. 5A illustrates a process of sending data from the UE to an application server within the wireless communications system of FIG. 4 in accordance with an embodiment of the invention.

FIG. 5A illustrates a process of sending data from UE 200 to the application server 170 within the wireless communications system of FIG. 4 in accordance with an embodiment of the invention.

Referring to FIG. 5A, assume that UE 200 establishes a connection with the RAN 120 and registers for a given communication service (e.g., PTT, etc.) with the application server 170 within the WWAN 400, and that the UE 200 is engaged in a communication session for the given communication service via the established WWAN connection in 500. For example, the data exchanged between UE 200 and the application server 170 in 500 corresponds to low-bandwidth data, such as low-bandwidth streaming sessions (e.g., voice data) and/or file-transfers of files below a given size threshold used for WWAN-based file transfers. Next, while UE 200 continues the WWAN-based communication session in 500, UE 200 determines whether to transmit a file to the application server 170 over the WLAN 420, 505. If UE 200 determines that the file need not be transmitted over the WLAN 420, the process returns to 500 and UE 200 transmits the file within the established WWAN-based communication session. Otherwise, if UE 200 determines to transmit the file over the WLAN 420, UE 200 establishes a connection to the WLAN AP 425 of the WLAN 420 and obtains a private IP address, 510. In an example, UE 200 may already be connected to the WLAN 420 when the determination of 505 is made, in which case the WLAN-connection operation of 510 can be skipped.

The remainder of FIG. 5A operates under the assumption that UE 200 is aware or at least believes there is a high likelihood that NAT 430, WLAN firewall 435 and WWAN firewall 405 will function as obstructions to a direct attempt to send the file to the application server 170 via the WLAN 420. Accordingly, the NAT/firewall bypass procedures discussed below are based upon this assumption.

Referring to FIG. 5A, after UE 200 connects to the WLAN 420 via the WLAN AP 425 in 510, UE 200 requests its public IP address from the file server 410 using a protocol such as Session Traversal Utilities for NAT (STUN). STUN is defined in RFC 5389 and provides a means for an endpoint to determine the IP address and port allocated by a NAT that corresponds to its private IP address and port. STUN, along with some extensions, may also be used to keep a NAT binding alive or the like, and to perform connectivity checks between two endpoints. The UE 200 uses a binary signaling protocol to implement a protocol (e.g., STUN) in order to request its public IP address, 515, and also to maintain its IP address and port association. The file server 410 then sends the public IP address to UE 200, 520. As will be appreciated, the public IP address corresponds to the IP address used by entities external to the WLAN 420 to send data to/from the WLAN 420, whereas the private IP address is the IP address used for entities within the WLAN 420 itself. In addition to obtaining the public IP address for the WLAN 420, UE 200 monitors the behavior of the NAT 430 in order to determine additional WLAN connection information, 525. For example, in 525, UE 200 can exchange IP data packets with the file server 410 while changing the source port and/or destination port of the IP data packets. In this manner, UE 200 can determine the relationship between the internal or private IP address and port number of UE 200 within the WLAN 420 with the public IP address and port number for the WLAN 420. For example, the UE 200 can send two or more follow-up queries to the file server 410 to determine its public IP and port for that specific private IP to test the NAT behavior. In each of the queries, the UE 200 can change the source port in the UDP header. The UE can compare its request and the responses received from the file server 410 to determine a relation used by the NAT to map the 4 tuple (e.g., private IP address of UE 200, UE 200's port number, the file server 410's IP address and the file server 410's port number) to the UE 200's public IP address and port numbers as assigned by the NAT. For example, the UE 200's determination at 525 can correspond to figuring out that the NAT 430 is merely adding a fixed number (e.g., 10000, etc.) to the ports selected as long as the port numbers are within the allowable limits, based on the messages exchanged as noted above.

After UE 200 determines the public IP address (515 and 520) as well as the NAT behavior related to the correspondence between UE 200's private IP address and port number to the public IP address and port number (525), UE 200 uses this information to punch holes through the NAT 430 and WLAN firewall 435 of the WLAN 420 in an attempt to send the file to the application server 170, 530. In 530, assume that UE 200 is successful in exporting the file outside of the WLAN 420 and to the Internet 175, but that the WWAN firewall 405 blocks the file transfer. Accordingly, UE 200 determines that the attempt to transmit the file over the WLAN 420 to the application server 170 has failed due to the WWAN firewall 405, 535.

Accordingly, UE 200 transmits its WLAN connection information to the application server 170 over its WWAN connection, 540. For example, the WLAN connection information sent to the application server 170 in 540 can include the WLAN'S speed or bandwidth, the WLAN'S latency, the WLAN's packet drop rate, and/or other performance information associated with the WLAN connection to WLAN 420.

The application server 170 receives the WLAN connection information and then punches holes through its own WWAN firewall 405 within the WWAN 400 so as to send an ACK to UE 200's message from 540, 545. Because the ACK is generated within the firewalled WWAN 400, the ACK passes through the WWAN firewall 405 and is then sent to UE 200 over the WLAN 420, 550. Also in 545, along with punching the holes in the WWAN firewall 405, the application server 170 opens the WWAN firewall 405 to permit bi-directional traffic to pass-through the WWAN firewall 405 between UE 200 and the application server 170 until expiration of a given WWAN firewall timer. Thus, after opening the WWAN firewall 405 to permit bi-directional traffic between UE 200 and the application server 170, the ACK sent back to UE 200 functions to notify UE 200 that another attempt to transmit data through the WWAN firewall 405 to the applicant server 170 will be successful.

Accordingly, UE 200 makes another attempt to send the file to the application server 170 via the WLAN 420 in 555. The attempt of 555 is successful because both the WLAN firewall 435 and WWAN firewall 405 are now open to traffic being exchanged between UE 200 and the application server 170.

Figure 5B:
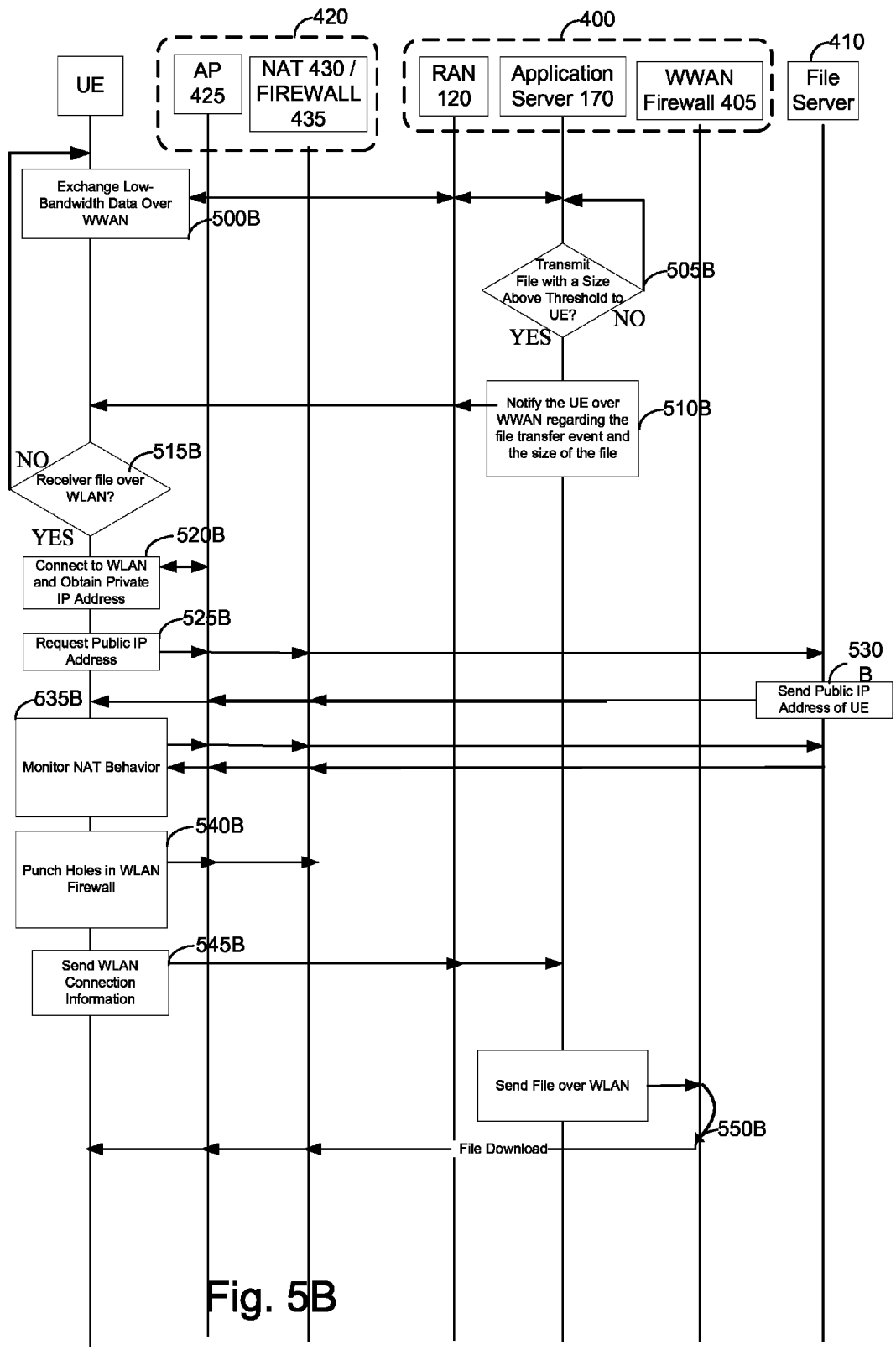
FIG. 5B illustrates a process of sending data from the application server to the UE within the wireless communications system of FIG. 4 in accordance with another embodiment of the invention.

FIG. 5B illustrates a process of sending data from the application server 170 to the UE 200 within the wireless communications system of FIG. 4 in accordance with another embodiment of the invention. FIG. 5B is similar in some respects to FIG. 5A, except that FIG. 5A illustrates a process of uploading a file from UE 200 to the application server 170 whereas FIG. 5B illustrates a process of downloading a file from the application server 170 to UE 200.

Accordingly, referring to FIG. 5B, similar to 500 of FIG. 5A, assume that UE 200 establishes a connection with the RAN 120 and registers for a given communication service (e.g., PTT, etc.) with the application server 170 within the WWAN 400, and that the UE 200 is engaged in a communication session for the given communication service via the established WWAN connection, 500B. Next, while UE 200 continues the WWAN-based communication session in 500B, the application server 170 determines whether to transmit a file to UE 200 over the WLAN 420, 505B. If the application server 170 determines that the file need not be transmitted over the WLAN 420 (e.g., if the file-size is not above a threshold), the process returns to 500B and the application server 170 transmits the file within the established WWAN-based communication session. Otherwise, if the application server 170 determines to transmit the file over the WLAN 420, the application server 170 notifies UE 200, over the WWAN, of the application server 170's intent to transmit a relatively large file to the UE 200, 510B.

Referring to FIG. 5B, UE 200 receives the notification from the application server 170 and determines whether to attempt to download the file from the application server 170 over the WLAN 420, 515B. If UE 200 determines not to attempt to download the file over the WLAN 420 in 515B, the process returns to 500B where the file is either downloaded over the WWAN 400 or is simply not downloaded at all. Alternatively, if UE 200 determines to attempt to download the file over the WLAN 420 in 515B, the process advances to 520B.

In FIG. 5B, 520B through 535B substantially correspond to 510 through 525, respectively, of FIG. 5A, and as such will not be described further for the sake of brevity. In 540B, UE 200 punches holes through the WLAN NAT 430 and firewall 435 in order to permit the file from the application server 170 to pass-through the WLAN firewall 435. In 545B, UE 200 transmits the WLAN connection information to the application server 170, as in 540 of FIG. 5A. The application server 170 receives the WLAN connection information from UE 200 and then transmits or downloads the file to UE 200 over the WLAN 420, 550B.

Figure 6A:
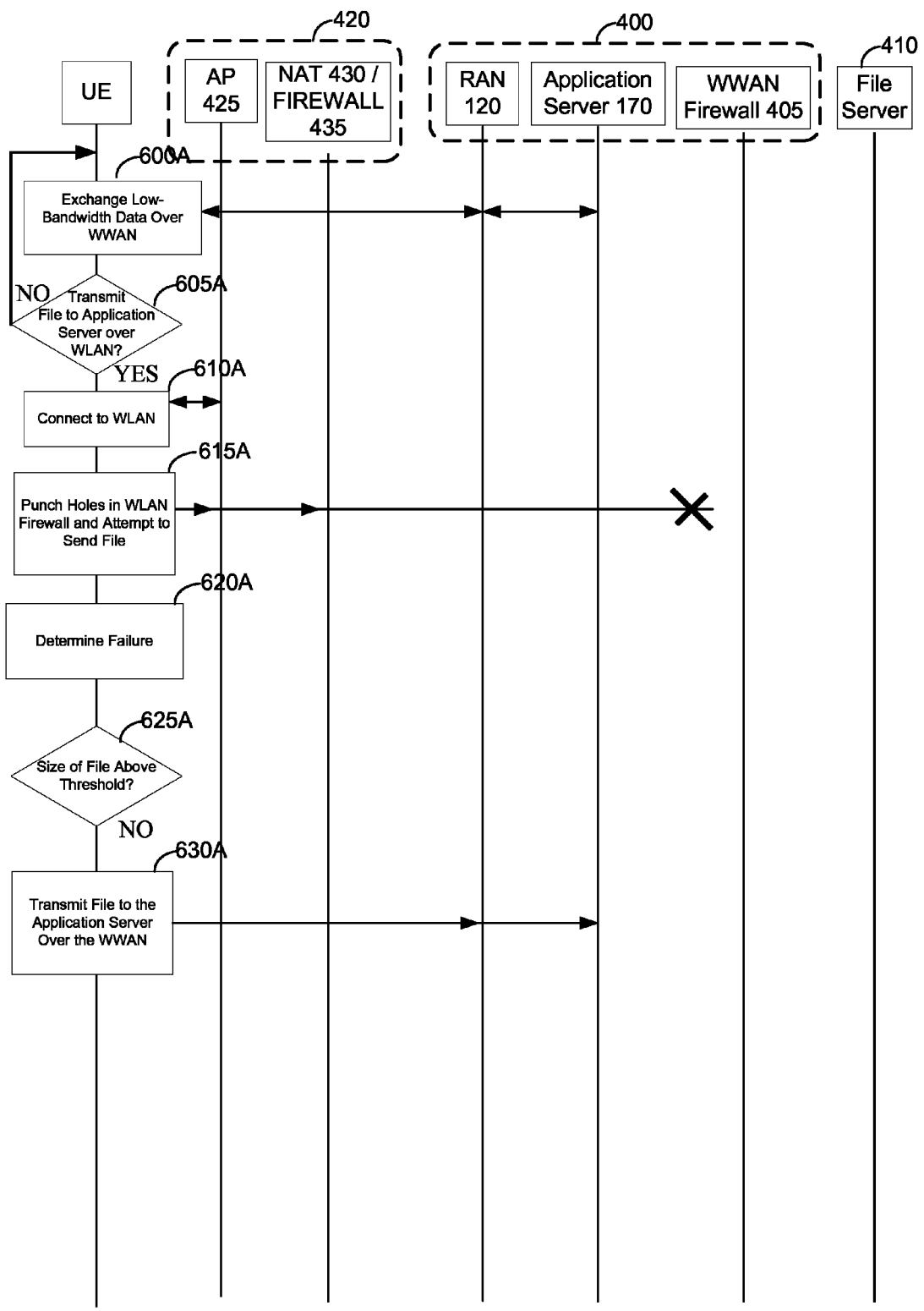
FIG. 6A illustrates a process of sending data from the UE to the application server within the wireless communications system of FIG. 4 in accordance with another embodiment of the invention.

FIG. 6A illustrates a process of sending data from UE 200 to the application server 170 within the wireless communications system of FIG. 4 in accordance with another embodiment of the invention.

Referring to FIG. 6A, assume that UE 200 establishes a connection with the RAN 120 and registers for a given communication service (e.g., PTT, etc.) with the application server 170 within the WWAN 400, and that the UE 200 is engaged in a communication session for the given communication service via the established WWAN connection in 600A. For example, the data exchanged between UE 200 and the application server 170 in 500 corresponds to low-bandwidth data, such as low-bandwidth streaming sessions (e.g., voice data) and/or file-transfers of files below a first size threshold used for WWAN-based file transfers. Next, while UE 200 continues the WWAN-based communication session in 600A, UE 200 determines whether to transmit a file to the application server 170 over the WLAN 420, 605A. If UE 200 determines that the file need not be transmitted over the WLAN 420, the process returns to 600A and UE 200 transmits the file within the established WWAN-based communication session. Otherwise, if UE 200 determines to transmit the file over the WLAN 420, UE 200 establishes a connection to the WLAN AP 425 of the WLAN 420, 610A. In an example, UE 200 may already be connected to the WLAN 420 when the determination of 605A is made, in which case the WLAN-connection operation of 610A can be skipped.

Next, UE 200 attempts to send the file to the application server 170 over the WLAN 420 through the NAT 430, WLAN firewall 435 and the WWAN firewall 405, 615A, and the transmission attempt of 615A results in failure due at least to the WWAN firewall 405, 620A. For example, 615A and 620A may correspond to 530 and 535 of FIG. 5A, respectively, in an example.

Conventionally, after an upload is blocked by a WWAN firewall, the UE would simply attempt to re-transmit the file to be uploaded again and again, resulting in numerous file-transfer failures and wasting battery life. In an embodiment of the invention, after determining that the attempt to transmit the file to the application server 170 over the WLAN 420 has failed due in part to the WWAN firewall 405 in 620A, UE 200 assumes that subsequent attempts to upload the file in the same manner will also result in failure. Accordingly, instead of repetitively attempting upload-attempts that result in failure, UE 200 determines whether the file to be transmitted to the application server 170 is above a second size threshold, 625A. For example, the second size threshold can be set to a higher level than the first size threshold, such that the first size threshold functions to facilitate a determination regarding whether to attempt a WLAN-based file transfer (if possible) at 605A, and the second size threshold functions to facilitate a determination regarding whether to transmit the file to the application server 170 in the event that the initial attempt to transmit the file to the application server 170 over the WLAN 420 results in failure.

In the embodiment of FIG. 6A, assume that the file to be transmitted to the application server 170 is not above the second size threshold. Accordingly, UE 200 transmits the file to the application server 170 in 630A within the communication session between UE 200 and the application server 170 over the WWAN 400 as discussed above at 600A. Accordingly, FIG. 6A illustrates an example by which a WLAN-based file transfer is attempted, but if unsuccessful, a file having an intermediate file size (i.e., below the second size threshold) can still be sent to the application server 170 over the existing WWAN connection.

Figure 6B:
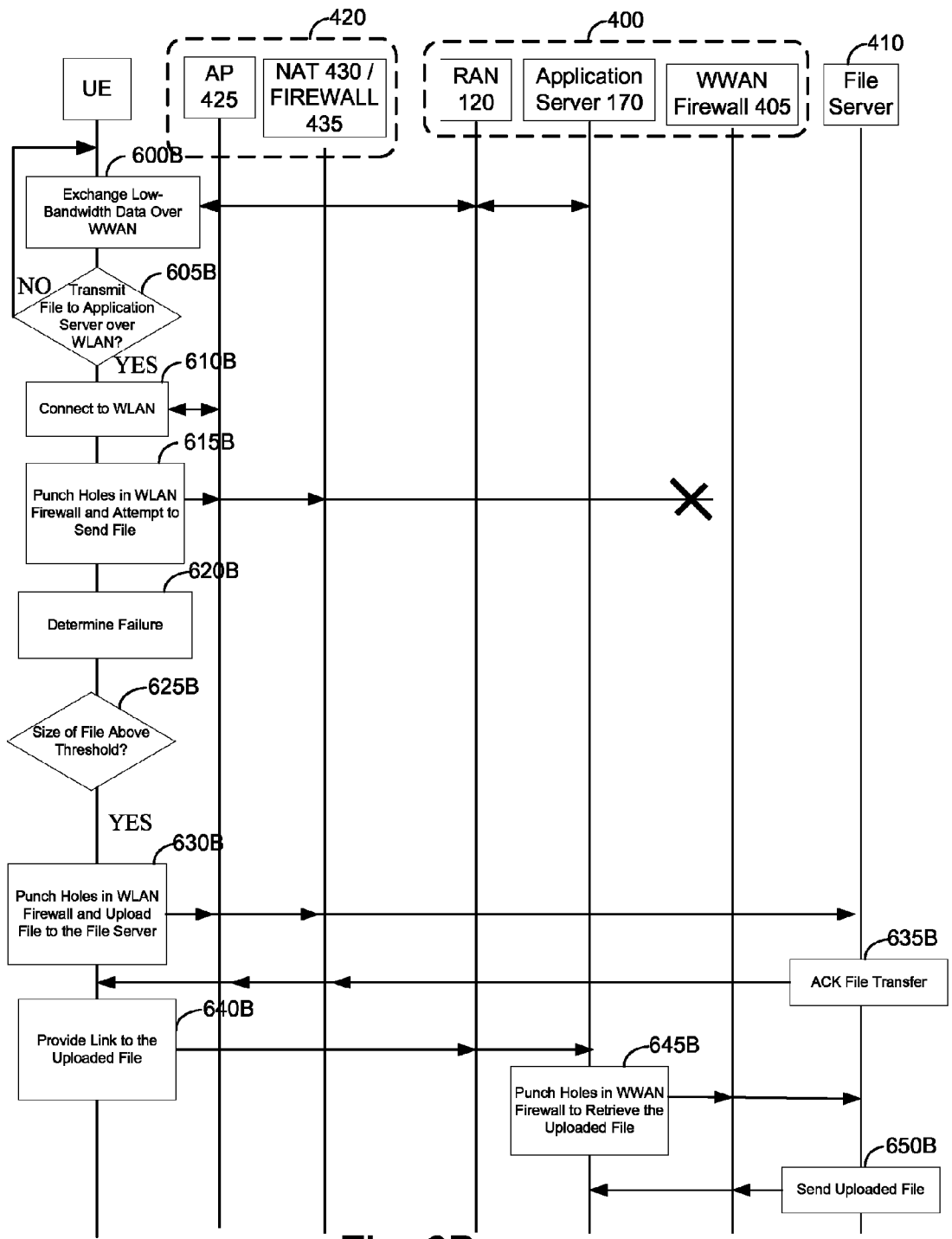
FIG. 6B illustrates a process of sending data from the UE to the application server within the wireless communications system of FIG. 4 in accordance with another embodiment of the invention.

FIG. 6B illustrates a process of sending data from UE 200 to the application server 170 within the wireless communications system of FIG. 4 in accordance with another embodiment of the invention. Referring to FIG. 6B, 600B through 625B substantially correspond to 600A through 625A of FIG. 6A, respectively, and will not be discussed further for the sake of brevity. In 625B, unlike 625A of FIG. 6A, assume that the file to be transmitted to the application server 170 is above the second size threshold.

Accordingly, UE 200 punches holes through the WLAN firewall 435 in order to upload the file to the file server 410, 630B. As will be appreciated, the file server 410 is not behind the WWAN firewall 405 such that the upload or file-transfer of 630B will not be affected or blocked by the WWAN firewall 405. When the upload is complete, the file server 410 acknowledges completion of the file-transfer, 635B.

In association with uploading the file to the file server 410 (e.g., before the upload begins, during the upload, after the upload completes, etc.), UE 200 transmits a link to the uploaded file on the file server 410 to the application server 170 over the WWAN 400, 640B. Thus, instead of uploading the entire file over the WWAN 400, bandwidth on the WWAN 400 is conserved by only providing a relatively small link to the file that was uploaded over the WLAN 420.

The application server 170 receives the link to the file on the file server 410 from UE 200, and sends a request to retrieve the uploaded file to the file server 410 by punching holes through the WWAN firewall 405 of the WWAN 400, 645B. In particular, in 645B, the application server 170 can temporarily open the WWAN firewall 405 at least for the file server 410 to transfer the uploaded file. The file server 410 receives the request for the uploaded file from the application server 170 and then provides the uploaded file to the application server 170 at the WWAN 400 through the WWAN firewall 405, 650B.

Figure 7:
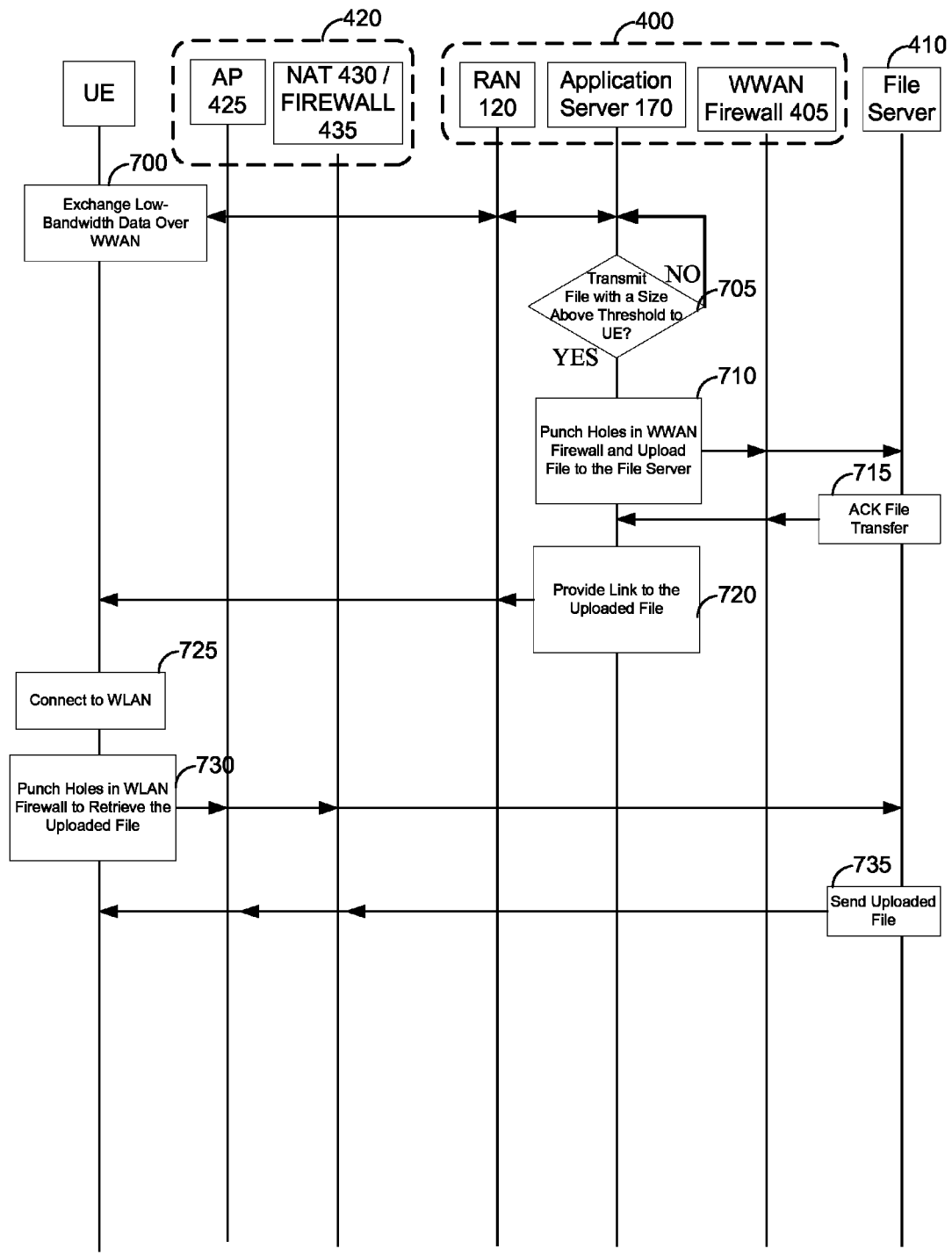
FIG. 7 illustrates a process of sending data from the application server to the UE within the wireless communications system of FIG. 4 in accordance with another embodiment of the invention.

FIG. 7 illustrates a process of sending data from the application server 170 to the UE 200 within the wireless communications system of FIG. 4 in accordance with another embodiment of the invention. FIG. 7 is similar in some respects to FIG. 6B, except that FIG. 6B illustrates a process of uploading a file from UE 200 to the application server 170 whereas FIG. 7 illustrates a process of downloading a file from the application server 170 to UE 200.

Referring to FIG. 7, assume that UE 200 establishes a connection with the RAN 120 and registers for a given communication service (e.g., PTT, etc.) with the application server 170 within the WWAN 400, and that the UE 200 is engaged in a communication session for the given communication service via the established WWAN connection in 700. For example, the data exchanged between UE 200 and the application server 170 in 500 corresponds to low-bandwidth data, such as low-bandwidth streaming sessions (e.g., voice data) and/or file-transfers of files below a first size threshold used for WWAN-based file transfers. Next, while UE 200 continues the WWAN-based communication session in 700, the application server 170 determines whether to transmit a file to UE 200 over the WLAN 420, 705. If the application server 170 determines that the file need not be transmitted over the WLAN 420, the process returns to 700 and the application server 170 transmits the file within the established WWAN-based communication session. Otherwise, if the application server 170 determines to transmit the file over the WLAN 420, the application server 170 punches holes through the WWAN firewall 405 in order to transfer the file to the file server 410, 710. As will be appreciated, the file server 410 is not behind the WLAN firewall 435 such that the upload or file-transfer of 710 will not be affected or blocked by the WLAN firewall 435. When the file-transfer is complete, the file server 410 acknowledges completion of the file transfer, 715.

In association with transferring the file to the file server 410 (e.g., before the transfer begins, during the transfer, after the transfer completes, etc.), the application server 170 transmits a link to the uploaded file on the file server 410 to UE 200 over the WWAN 400, 720. Thus, instead of downloading the entire file over the WWAN 400, bandwidth on the WWAN 400 is conserved by only providing a relatively small link to the file to be downloaded over the WWAN 400.

UE 200 receives the link to the file on the file server 410 from the application server 170, and establishes a connection to the WLAN AP 425 of the WLAN 420, 725. In an example, UE 200 may already be connected to the WLAN 420 when the link to the file to be downloaded from the file server 410 is received at UE 200 in 720, in which case the WLAN-connection operation of 725 can be skipped. Once UE 200 receives the link to the file to be downloaded from the file server 410 and the UE 200 has a WLAN connection, UE 200 sends a request to download the file from the file server 410 by punching holes through the WLAN firewall 435 of the WLAN 420, 730. In particular, in 730, UE 200 can temporarily open the WLAN firewall 435 at least for the download of the file from the file server 410. The file server 410 receives the request to download the file to UE 200 and then provides the file to UE 200 at the WWAN 400 through the WLAN firewall 435, 735.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium is coupled to the processor such that the processor can read information from, and write information to, the non-transitory storage medium. In the alternative, the non-transitory storage medium may be integral to the processor. The processor and the non-transitory storage medium may reside in an ASIC. The ASIC may reside in a user terminal (e.g., access terminal). In the alternative, the processor and the non-transitory storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of exchanging data between a user equipment (UE) and an application server in a wireless communications network, the UE configured to connect to both a wireless local area network (WLAN) and a wireless wide area network (WWAN), the application server being positioned within the WWAN behind a WWAN firewall and the WLAN including a WLAN network address translation (NAT) component and firewall such that the UE and the application server do not have a persistent data connection over the WLAN, comprising:

exchanging data between the UE and the application server over the WWAN during a WWAN communication session;
determining to upload a file from the UE to the application server over the WLAN based on one or more session parameters;
obtaining, at the UE, WLAN connection information associated with a connection between the UE and the WLAN;
transmitting the WLAN connection information to the application server over the WWAN;
receiving, in response to the transmission, an indication that the application server has punched at least one hole in the WWAN firewall for file transfers from the UE over the WLAN; and uploading, in response to the indication, the file to the application server over the WLAN through the at least one hole punched in the WWAN firewall.

2. The method of claim 1, further comprising: determining that an initial attempt to upload the file to the application server over the WLAN is blocked by the WWAN firewall, wherein the obtaining, transmitting, receiving and uploading are performed responsive to the determination that the initial attempt is blocked by the WWAN firewall.

3. The method of claim 1, wherein the WLAN connection information relates to a performance level of the WLAN and includes one or more of a speed or bandwidth of the WLAN, a latency of the WLAN and/or a packet-drop rate of the WLAN.

4. The method of claim 1, wherein the WLAN connection information includes a private Internet Protocol (IP) address and a public IP address, wherein the private IP address is received from the WLAN and the public IP address are received from a network entity outside of the WLAN firewall.

5. The method of claim 4, wherein the network entity corresponds to a Session Traversal Utilities for NAT (STUN) server.

6. The method of claim 1, wherein the determination based on the one or more session parameters comprises a determination based upon the file being above a given size threshold.

7. The method of claim 1, wherein the transmission of the WLAN connection information is configured to prompt the application server to punch the at least one hole in the WWAN firewall.

8. The method of claim 1, wherein the punching of the at least one hole in the WWAN firewall by the application server for file transfers from the UE over the WLAN is for a limited period of time.

9. A user equipment (UE) configured to exchange data with an application server in a wireless communications network, the UE configured to connect to both a wireless local area network (WLAN) and a wireless wide area network (WWAN), the application server being positioned within the WWAN behind a WWAN firewall and the WLAN including a WLAN network address translation (NAT) component and firewall such that the UE and the application server do not have a persistent data connection over the WLAN, comprising:

logic configured to exchange data between the UE and the application server over the WWAN during a WWAN communication session; logic configured to determine to upload a file from the UE to the application server over the WLAN based on one or more session parameters;
logic configured to obtain WLAN connection information associated with a connection between the UE and the WLAN;
logic configured to transmit the WLAN connection information to the application server over the WWAN;

logic configured to receive, in response to the transmission, an indication that the application server has punched at least one hole in the WWAN firewall for file transfers from the UE over the WLAN; and logic configured to upload, in response to the indication, the file to the application server over the WLAN through the at least one hole punched in the WWAN firewall.

10. A non-transitory computer-readable storage medium containing instructions stored thereon, which, when executed by a user equipment (UE) configured to exchange data with an application server in a wireless communications network, the UE configured to connect to both a wireless local area network (WLAN) and a wireless wide area network (WWAN), the application server being positioned within the WWAN behind a WWAN firewall and the WLAN including a WLAN network address translation (NAT) component and firewall such that the UE and the application server do not have a persistent data connection over the WLAN, causes the UE to perform operations, the instructions comprising:

program code to exchange data between the UE and the application server over the WWAN during a WWAN communication session;

program code to determine to upload a file from the UE to the application server over the WLAN based on one or more session parameters;

program code to obtain WLAN connection information associated with a connection between the UE and the WLAN;

program code to transmit the WLAN connection information to the application server over the WWAN;

program code to receive, in response to the transmission, an indication that the application server has punched at least one hole in the WWAN firewall for file transfers from the UE over the WLAN; and program code to upload, in response to the indication, the file to the application server over the WLAN through the at least one hole punched in the WWAN firewall.

* * * * *